2,800,496
ORGANIC NITRILE PRODUCTION

William G. Toland, Jr., San Rafael, Calif., assignor to California Research Corporation, San Francisco, Calif., a corporation of Delaware No Drawing. Application March 15, 1955,
Serial No. 494,539

7 Claims. (Cl. 260—465)

This invention relates to a process for producing organic nitriles. More particularly, it relates to a process in which an organic carboxylic acid or the ammonium salts or amides of such acids are converted directly to the corresponding nitriles.

A variety of uses for organic nitriles are known to those skilled in the art. Organic nitriles are valuable chemical intermediates; certain of them, especially the aromatic nitriles, are useful in the production of dye stuffs, while the nitriles in general can be readily hydrogenated to produce the corresponding amines.

Pursuant to the invention, organic nitriles are produced by heating an ammonium salt of either sulfuric acid or phosphoric acid with a thermally stable organic carboxylic acid, or with the amide or ammonium salt of such an acid. The mixture of ammonium salt and organic material is heated to a temperature above about 200° C., usually to a temperature in the range from 200 to 400° C., and at this temperature the organic component of the heated mixture is converted to a nitrile.

The process of the invention is illustrated by the following examples.

Example 1

The still pot of a packed distillation column was charged with 264 parts by weight of diammonium phosphate and 33.2 parts by weight of isophthalic acid. The mixture was heated to 340–370° C. for a period of 40 minutes. During the heating, a small amount of ammonia gas was bled into the still pot and a distillate was removed overhead. The distillate was predominantly solid at room temperature. The distillate was washed with dilute aqueous ammonia to extract any free acid and the insoluble portion of the distillate was dried, following which its saponification equivalent was determined to be 67.8. An additional 2.7 parts by weight of solid material was recovered from the still head and an additional 2.5 parts by weight from the column. An additional 0.5 parts by weight of solid material was crystallized from the water employed in washing the distillate. The total yield of crude isophthalonitrile was 24.5 parts by weight, which represents a yield of 95.7% of theory. During the reaction, the isophthalic acid was completely converted.

Example 2

Example 1 was repeated, substituting terephthalic acid amide for the isophthalic acid employed in Example 1. The still pot was heated to 300–370° C. for 30 minutes. A small amount of ammonia was introduced into the still pot during the heating period and a distillate was collected overhead. The distillate was washed with dilute aqueous ammonia and dried. 22.4 parts by weight of solid product was recovered. The solid was extracted with mixed hexanes and the residue contained 19.8 parts by weight of terephthalonitrile and 2.6 parts by weight of para-tolunitrile.

Example 3

In this example the organic material was the reaction product obtained by oxidizing meta-xylene by the method described in U. S. Patent No. 2,610,980 to Naylor. The oxidation product contained ammonium isophthalate, the diamide of isophthalic acid and the mixed salt-amide of isophthalic acid in which the ammonium salt of one carboxyl group is formed, while the other carboxyl group is converted to the amide.

40 parts by weight of the mixed ammonium salt-amide of isophthalic acid, 198 parts by weight of ammonium sulfate, and 102 parts by weight of 96% sulfuric acid were charged to the still pot of a packed distillation column. The mixture was held at temperatures ranging from 310 to 370° C. for 50 minutes, during which period a distillate was collected. The distillate was washed with dilute aqueous ammonia to separate free acid materials from the nitrile. The residual distillate was then washed with mixed hexanes to remove any tolunitrile or benzonitrile which might be present, and was then dried. 14.5 parts by weight of isophthalonitrile having a saponification equivalent of 68.0 were recovered. The dilute aqueous ammonia employed to wash the crude distillate was acidified, causing the formation of a precipitate. The precipitate was removed and washed and dried. 7.8 parts by weight of this material were recovered. The material had a neutral equivalent of 156.5. A small amount of meta-cyanobenzoic acid was recovered from the packing of the distillation column.

Example 4

115 parts by weight of ammonium bisulfate, 40 parts by weight of ammonium sulfate, and 16.6 parts by weight of isophthalic acid were charged to the still pot of a packed distillation column. The pot was held at a temperature ranging from 230 to 300° C. for a period of 150 minutes, during which time volatile products were removed overhead. The distillate was washed with dilute aqueous ammonia and dried. 4 parts by weight of isophthalonitrile were recovered. The dilute aqueous ammonia extract was acidified and 5.3 parts by weight of meta-cyanobenzoic acid were precipitated.

Example 5

122 parts by weight of benzoic acid and 27 parts by weight of ammonium sulfate were charged to the still pot of a packed distillation column. The mixture was held at a temperature between 220 and 250° C. for a total of 420 minutes, during which time a total of 70.4 parts by weight of distillate were taken overhead. The distillate was found to consist of 46% by weight of benzoic acid and 54% by weight of benzonitrile. This represented a 35% conversion of benzoic acid and a benzonitrile yield of 87.5% of theory.

Example 6

115 parts by weight of ammonium bisulfate, 40 parts by weight of ammonium sulfate, and 13.5 parts by weight of sebacic acid were charged to a still pot equipped with a distillation head. The pot was held at a temperature between 300 and 330° C. for a period of 180 minutes, during which time nitrogen was slowly bubbled into the pot. A distillate was removed overhead. The odor of sulfur dioxide was evident in the gas leaving the distillation zone. The distillate was taken up with ether and dilute aqueous ammonia was added to extract acidic components. The ether phase was separated and evaporated to dryness and yielded 5.5 parts by weight of sebacic dinitrile. 2.8 parts by weight of sebacic mononitrile were recovered from the aqueous ammonia phase.

Example 7

50 parts by weight of lauric acid and 15.4 parts by weight of ammonium sulfate were charged to a still pot equipped with a distillation head. The mixture was held at about 280° C. for a total of 150 minutes, during which period a slow stream of nitrogen was introduced into the pot. Distillate was collected overhead. The organic phase of the distillate was found to contain 5.48 parts by weight of lauric nitrile, 8.45 parts by weight of unconverted lauric acid, and 2.57 parts by weight of hydrocarbon material believed to be undecane.

Example 8

When Example 7 is repeated, substituting diammonium phosphate for ammonium sulfate, similar production of lauric nitrile is obtained.

Further experimental investigation of the above-described method of producing organic nitriles establishes that the reaction occurring is a general one and that any thermally stable organic carboxylic acid or the ammonium salt or amide of such an acid can be converted to the corresponding nitrile by heating with an ammonium salt in the manner above described to a temperature above about 200° C. For present purposes, acids are considered thermally stable if they undergo no marked decomposition at temperatures in the range from 200–250° C. Thus, toluic acids are converted to tolunitriles, $\beta$-naphthoic acid is converted to the corresponding nitrile, caproic acid to capronitrile (under pressure), acetic acid to acetonitrile, nicotinic acid to nicotinonitrile, and chlorobenzoic acid to its nitrile. Phenylacetic acid, tert.-butylbenzoic acid, and trimesic acid are also converted to the corresponding nitriles by the process of the invention.

The ammonium salt employed in the process of the invention is preferably an ammonium salt of either sulfuric acid or phosphoric acid, e. g., ammonium sulfate, ammonium bisulfate, monoammonium phosphate and diammonium phosphate, and ammonium salts of dehydrated forms of these acids, such as ammonium pyrophosphates. While ammonium salts of these two acids are preferred, ammonium salts of other stable inorganic acids can be employed if desired. Ammonium nitrate should be avoided because of its instability and power as an oxidizing agent and ammonium chloride sublimes so readily that it is not a convenient material to use unless the reaction is being carried out under pressure.

As indicated above, the reaction is carried out at a temperature above about 200° C., and preferably at a temperature in the range from about 200 to 400° C. At lower temperatures the rate of reaction is slow and at temperatures appreciably above 400° C. losses due to decomposition of reactants and reaction products tend to increase prohibitively. The temperature within the foregoing range is preferably above the boiling point of the nitrile product being prepared. However, if this boiling point is high, evaporation of the nitrile product can be facilitated by passing a stream of either ammonia or inert gas into the reaction zone.

The reaction is desirably conducted at atmospheric pressure, but where the acid charged to the process is highly volatile, it may be desirable to employ superatmospheric pressure. Conversely, where the acid charged and the nitrile product both have very high boiling points, it may be desirable to operate the reaction zone under a reduced pressure to facilitate removal of the nitrile product from the reaction zone.

The reaction can be carried out either batch-wise or continuously. Continuous operation is readily achieved by maintaining a pool of molten inorganic ammonium salt in the bottom of a distillation column. The acid component of the reaction mixture is fed into the body of molten salt and ammonia gas is passed into the body of molten salt at a slow rate, either continuously or intermittently. The desired nitrile product and water are removed from the top of the column.

I claim:

1. A process which comprises producing organic nitriles by reacting, as the sole essential reactants (1) a material selected from the group consisting of ammonium sulfates and ammonium phosphates and (2) a material selected from the group consisting of thermally stable aromatic and saturated aliphatic organic carboxylic acids, amides of said acids and ammonium salts of said acids, said reaction being effected by forming a mixture of said sole essential reactants (1) and (2) and heating said mixture to an elevated temperature above about 200° C.

2. The process of claim 1 wherein said reactant (2) is an organic carboxylic acid.

3. The process of claim 2 wherein said organic carboxylic acid is an aromatic acid.

4. The process of claim 3 wherein said aromatic acid is isophthalic acid.

5. The process of claim 1 wherein said mixture of reactants (1) and (2) is heated to a temperature of from about 200° C. to 400° C.

6. The process of claim 1 wherein said reactant (1) is an ammonium phosphate.

7. The process of claim 1 wherein said reactant (1) is an ammonium sulfate.

References Cited in the file of this patent

UNITED STATES PATENTS

| | | |
|---|---|---|
| 2,339,672 | Biggs | Jan. 18, 1944 |
| 2,668,175 | Reppe et al. | Feb. 2, 1954 |
| 2,678,941 | Ferstandig | May 18, 1954 |

OTHER REFERENCES

Terem et al.: 43 C. A. 7307 (1949).